April 8, 1924.
O. RICHTER ET AL
OIL PURIFIER
Filed April 11, 1922
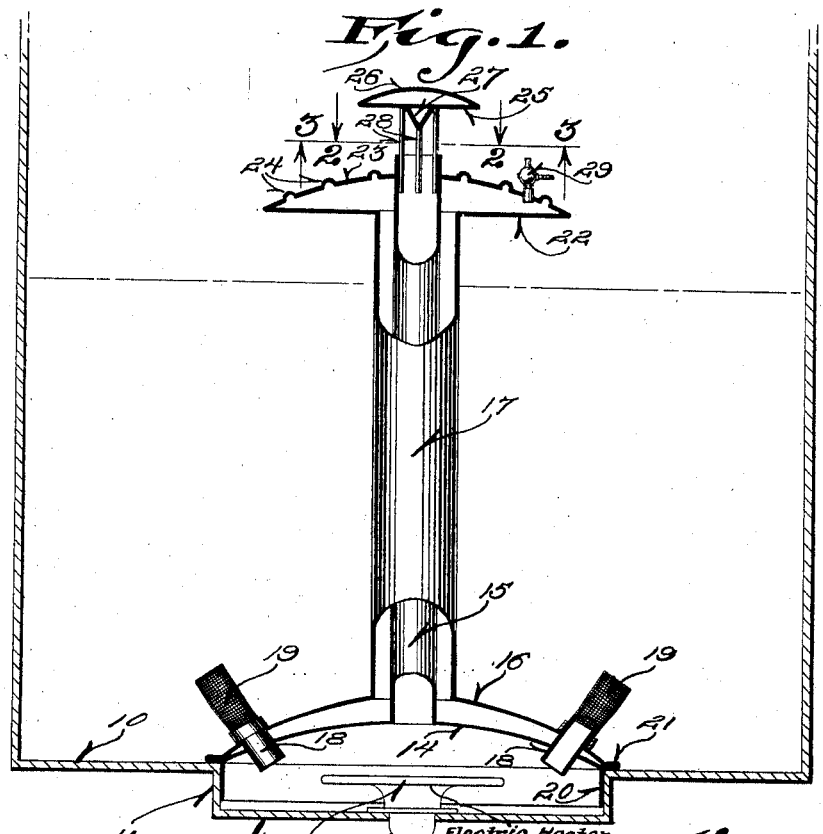
Fig. 1.
Fig. 3.
Fig. 2.
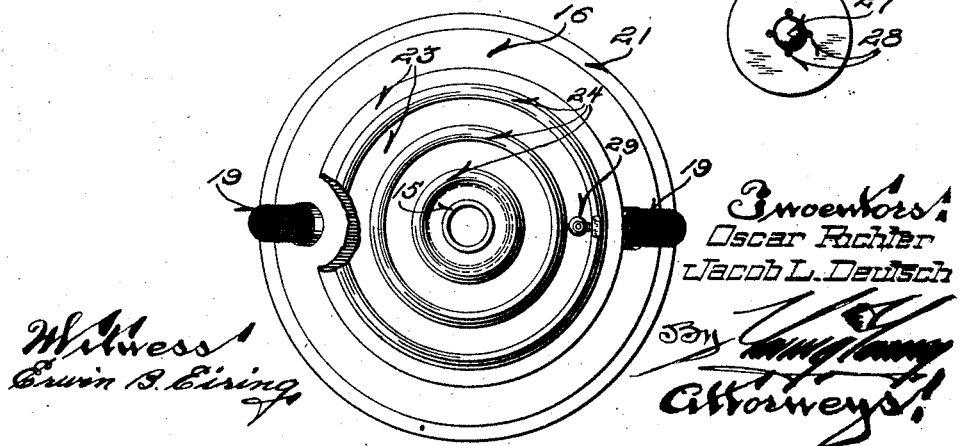
Inventors
Oscar Richter
Jacob L. Deutsch Patented Apr. 8, 1924.

1,489,278

UNITED STATES PATENT OFFICE.

OSCAR RICHTER AND JACOB L. DEUTSCH, OF MILWAUKEE, WISCONSIN.

OIL PURIFIER.

Application filed April 11, 1922. Serial No. 551,736.

*To all whom it may concern:*

Be it known that we, OSCAR RICHTER and JACOB L. DEUTSCH, both citizens of the United States, and residents of Milwaukee, in the county of Milwaukee and State of Wisconsin, have invented certain new and useful Improvements in Oil Purifiers; and we do hereby declare that the following is a full, clear, and exact description thereof.

The invention relates to devices for reclaiming oils in general, but particularly those found in crank cases.

The invention comprises a tank containing oil to be purified, an electrical heating unit in the bottom of the tank, means for conveying oil in small quantities to the heating unit, a pair of tubular members spaced with respect to each other, the inner one conducting the heated oil upwardly and directing it against a baffle, which sprays it on a heating apron, the oil being subjected to a high temperature and evaporated.

An object of the invention is to provide a device of the character described, which is especially designed for the purpose of cleansing oils. Lubricating oils used in machinery such as internal combustion engines, and the like, soon become filled with carbon, particles of metal, kerosene and gasoline, to such an extent that they are of little value as a lubricant and, therefore, must be removed from the machinery and new oil supplied instead. By removing the foreign matter the material may be reclaimed, producing a high grade lubricant.

It is an object of the invention to treat the oil in a rapid, economical, and thorough manner. The liquid is admitted to the heater in small quantities and the heated substance is consequently raised to a high temperature in but a short interval of time and rises in a conducting tube, striking against a baffle and being directed against a heating apron. The substance, being at a high temperature and having a relatively large superficial area in consequence of the action of the baffle, is rapidly relieved of volatile constituents such as gasoline and kerosene. The tube conducting the heated fluid from the electric heater is spaced from a surrounding tube so that the oil in the container does not have a cooling effect on the heated fluid in the inner tube. Thus the electric heater operates to heat a small quantity to a very high temperature in a very short period of time, the undesirable vapors being completely and effectively removed.

The baffle is adjustable and operates to dispense the oil in radial lines on the heated apron. Strainers are provided to keep heavy dirt off the heaters, preventing tendency to burn out and short circuit so that the device is durable and lasts for a long time. The percolating action, in addition to removing the volatile substances, serves, also, to agitate the liquid so that subsequently the carbon is precipitated readily.

With the above and other objects in view, which will appear as the description proceeds, our invention resides in the novel construction, combination and arrangement of parts, substantially as hereinafter described and more particularly defined by the appended claims, it being understood that such changes in the precise embodiment of the herein disclosed invention may be made as come within the scope of the claims.

In the accompanying drawing, we have illustrated one complete example of the physical embodiment of the present invention constructed according to the best mode we have so far devised for the practical application of the principles thereof, and in which:

Figure 1 is a central sectional view of the percolating unit as applied to a container.

Figures 2 and 3 are cross sections thereof on the line indicated in Figure 1.

Container 10 is integral with a depending sleeve 11 having a bottom 12 supporting an electric heater 13. The percolator comprises a shell 14 rigid with an inner tube 15 and an outer shell 16 rigid with an outer tube 17. Tubes 18 are directed through shells 14 and 16 and support removable strainers 19 of cylindrical form slidable into position on the tubes. A depending flange 20 rigid with the shells is in close contactual relationship with sleeve 11 and cooperating with the sleeve is an annular rib 21 to support the percolator in position. The percolator may be readily removed by the upward movement of flange 20 with respect to sleeve 11.

Outer tube 17 terminates in plate 22 which is integral with an apron 23 provided with a series of annular, concentric corrugated deformations 24. The baffle consists of a plate 25 rigid with a top 26 and carrying a cone 27 positioned centrally of a pair of resilient arms 28 adapted to be received in tube 15. The oil from the crank case, being admitted to heater 13 in small quantities, is rapidly raised to a relatively high temperature and rises rapidly in inner tube 15. The fact that the outer tube 17 and shell 16 are spaced from the corresponding inner parts, facilitates the elevation of the liquid to a high temperature.

If the oil in container 10 were immediately in contact with inner tube 15, the fluid would be rapidly cooled. The percolating action drives the oil upwardly against cone 27, which deflects it radially and cooperates with plate 25 to dispense the oil, which is substantially at a temperature between 225 and 250 F. against apron 23. The corrugated deformations 24 operate to retard the radial travel of the substance so that it is exposed for an appreciable interval of time. The fact that the liquid is then broken up into small drops gives it a great superficial area so that the gasoline and kerosene vapors, which are especially volatile, are rapidly and completely removed. The oil then finds its way into the rest of the fluid and the entire contents of the container 10 are subjected to agitation as a result of the outflow through tubes 18 and the deposit of the heated liquid from above. The level of the oil in container 10 is substantially as indicated in Figure 1.

The invention is not limited to the exact means illustrated, whereby inner tube 15 is spaced from the oil in container 10, but this tube may be directed outwardly through the walls of the container and spaced laterally from the inner container 10. It is important, however, that the oil in the container should not be brought directly in contact with the tube 15, as this would result in immediate cooling of the fluid.

Apron 23 is provided with a stop-cock 29 which may be manipulated to relieve excessive air pressure distributed by the expansion of the air as the result of the heating of the oil. The increased air pressure might result in the disruption of one of the walls. If desired, a number of percolators may be used in one container in order to make the operation more rapid or to treat a greater quantity of oil. After the evaporating process has been completed, soap powder may be used to assist in settling the carbon, a tendency of which to precipitate has been produced by the agitating of the oil. The lubricating oil may then be reclaimed in the usual manner by drawing off.

We claim:—

1. In a device of the class described, the combination of a container for oil, an electric heater, means for conveying oil in small quantities to said heater, an inner tube, means supporting said inner tube over said heater, an outer tube spaced from said inner tube for preventing oil from coming in contact with the outer side of said inner tube, a baffle over said inner tube in the path of travel of oil from said inner tube, and an apron against which the oil is directed by said baffle.

2. In a device of the class described, the combination of a container for oil, an electric heater, means for conducting oil to said heater, an inner tube, means supporting said inner tube over said heater, an outer tube enveloping said inner tube and preventing oil from coming into contact with the outer side of said inner tube, an apron, deformations on said apron, and a baffle over said inner tube in the path of travel of oil from said inner tube directing the heated oil against said apron.

3. In a device of the class described, the combination of a container for oil, an electric heater, means for conducting oil to said heater, an inner tube, means supporting said inner tube over said heater, an outer tube enveloping said inner tube and preventing oil from coming into contact with the outer side of said inner tube, an apron, deformations on said apron, and a baffle directing the heated oil against said apron, said baffle being adjustable to vary the dispersion of the oil.

4. In a device of the class described, the combination of a container, a heater carried by the bottom of said container, an inner shell resting on said bottom and covering said heater, an inner tube supported by said inner shell and upwardly extending therefrom, an outer shell secured at its edge to the edge of said inner shell, and an outer tube enveloping said inner tube and upwardly extending from said outer shell.

In testimony that we claim the foregoing we have hereunto set our hands at Milwaukee, in the county of Milwaukee and State of Wisconsin.

OSCAR RICHTER.
JACOB L. DEUTSCH.